US006260436B1

United States Patent
Sander et al.

(10) Patent No.: US 6,260,436 B1
(45) Date of Patent: Jul. 17, 2001

(54) LOCKING DEVICE FOR A SELECTOR

(75) Inventors: Endmund Sander, Leonberg; Paul Weiss, Ostfildern, both of (DE)

(73) Assignees: DaimlerChrysler Ag; Dr. Ing. h.c.F. Porsche AG, both of Stuttgart (DE)

( * ) Notice: Subject to any disclaimer, the term of this patent is extended or adjusted under 35 U.S.C. 154(b) by 0 days.

(21) Appl. No.: 09/406,693

(22) Filed: Sep. 27, 1999

(30) Foreign Application Priority Data

Sep. 26, 1998  (DE) ............................................. 198 44 275

(51) Int. Cl.[7] .................................................. G05G 5/06
(52) U.S. Cl. ................................................ 74/529; 74/531
(58) Field of Search ........................... 74/529, 527, 531, 74/473.21, 473.27, 473.23

(56) References Cited

U.S. PATENT DOCUMENTS

| 4,603,905 | * | 8/1986 | Stucki | 297/300 |
| 4,926,688 |   | 5/1990 | Murasaki | 74/527 |
| 5,133,222 |   | 7/1992 | Hansson | 74/477 |
| 5,293,763 | * | 3/1994 | Asano et al. | 70/248 |
| 5,924,540 | * | 7/1999 | Kim | 192/220.4 |
| 5,950,782 | * | 9/1999 | Brauns et al. | 192/3.63 |

FOREIGN PATENT DOCUMENTS

| 19641706C1 | 3/1998 | (DE) . |
| 0519208A1 | 12/1992 | (EP) . |
| 655 570 | 5/1995 | (EP) . |
| 748 958 | 12/1996 | (EP) . |

* cited by examiner

Primary Examiner—David A. Bucci
Assistant Examiner—Vicky A. Johnson
(74) Attorney, Agent, or Firm—Crowell & Moring, L.L.P.

(57) ABSTRACT

A locking device is provided for a selector with a locking member, having devices for receiving at least one latching element. To actuate the latching element, a latching lever is actuated by outside force. To increase operating safety during the locking of the selector, a support on the latching lever holds the latching element in a first, locked position and another element for pivoting the latching element into a second, unlocked position.

11 Claims, 2 Drawing Sheets

LOCKING DEVICE FOR A SELECTOR

BACKGROUND OF THE INVENTION

This application claims the priority of 198 44 275.0, filed Sep. 26, 1998, the disclosure of which is expressly incorporated by reference herein.

The present invention relates to a locking device for a selector that can be used, for example, for locking a selector lever in vehicles.

The latching forces to be transmitted by latching elements can reach comparatively high values, because the selector lever is latched with the aid of the latching element to prevent misuse and possibly even vehicle theft. Thus, for example, with a latching force of 300 N on the selector lever, forces in the vicinity of 1500 N are developed on the latching element. It is already known from DE 196 41 706 C1, for example, that a solenoid provided with a return spring can engage a latching cam integral with a housing with a latching link fastened to the selector lever in order to latch the selector lever.

In addition, a locking device for a selector lever is described in EP 0 519 208 A1, in which a locking member mounted on the selector lever can be engaged at specified selector lever positions by depressions in a latching element, in this known embodiment a rotatable pawl. An angular lever mounted integrally with a housing is provided for moving the pawl. One end of the lever is connected with a solenoid and the other end has a roller abutting the pawl. The flanks of the depression are made steep to produce an engaging force on the selector lever with the selector lever latched, with only a small force component in the rotational direction of the pawl. Thereby these forces can easily be supported on a housing by the angular lever. In the ideal case, the solenoid does not have to accept any latching forces at all, but in any event only slight latching forces. Its principal task consists in bringing the angular lever into and out of engagement with the pawl, and this must be possible even when the selector lever is subjected to a force.

SUMMARY OF THE INVENTION

An object of the present invention is to improve a locking device for a selector with regard to its operating safety.

This object has been achieved according to the present invention by providing that a first element for supporting the pivotably mounted latching element in a first position and a second element for pivoting the latching element into a second position are provided on the latching lever.

Advantageously, the latching element is supported shape-wise against the housing in its first position by the latching lever, so that the latching element and hence the locking member can only move as a result of deformation of the latching lever. In this manner, even very high forces acting on the locking device can be accepted. This is especially true of forces which, if no shapewise support is provided for the latching element, can lead to an oscillating excitation of the latching element and thus eventually to an opening of the locking device. The second element provided on the latching lever for pivoting the latching element into its second position ensures that when the locking device is unlocked by pivoting the latching lever, the latching element is brought into its second position when the first element no longer supports the latching element.

Thus, to form the first element on the latching lever, the element is configured as a supporting lever that cooperates with a matching effective surface on the latching element. The supporting lever and the effective surface are aligned with respect to one another so that a force on the latching element acts in the direction to be latched, in other words to an increase in the application force of the supporting lever on the effective surface. The effective surface can be, for example, a recess on the latching element which is engaged by one end of the supporting lever. This and/or the supporting lever can also be provided with a roller to reduce frictional forces.

Preferably the latching element has two latching pawls that cooperate with the locking member. To receive the latching pawls, projections and/or recesses are provided on the locking member. The first latching pawl then acts in the resting position on the locking device and locks a select or lever provided on the selector, in, for example, its "P" position. The second latching pawl operates in a second (operating) position of the locking device and prevents actuation of the above selector lever, for example from the "N" position to the "R" position.

To actuate the latching lever and hence to actuate the locking device as a whole, preferably an outside force is applied to the locking lever by a solenoid. The introduction of the outside force into the latching lever is preferably to take place in such manner that the latching lever, following the application of the outside force, is moved initially with a high force and limited travel out of its spring-loaded resting position and then as the supporting lever pivots out of the effective surface on the latching element, is moved with a considerable travel and reduced actuating force. Such a force curve preferably can be achieved by the effective direction of the introduction of the outside force into the latching lever varying over the pivoting movement.

Although a long lever arm is provided at the beginning of the actuation of the latching lever, after the supporting lever is released this lever arm can be reduced in favor of a longer travel. The change in the lever arm preferably can be achieved by a suitable configuration of a surface used to introduce the outside force into the latching lever. A lever transmission can also be used, alternatively, to introduce the outside force into the latching lever. The particular advantage of this configuration is that, with a travel that is limited for applying the outside force—as is the case for example, with a solenoid—, unlocking the locking device even under load and also to ensuring a reliable outward pivoting of the latching element are possible.

Finally, the projections and recesses provided on the latching element are configured such that the supporting lever does not engage the latching lever outside the position of the locking member to be locked (for example, the position "P" of the selector lever). With this advantageous measure, the latching element can only be supported in the provided position of the locking member and thus assurance is provided that the latching element remains movable in these other positions.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
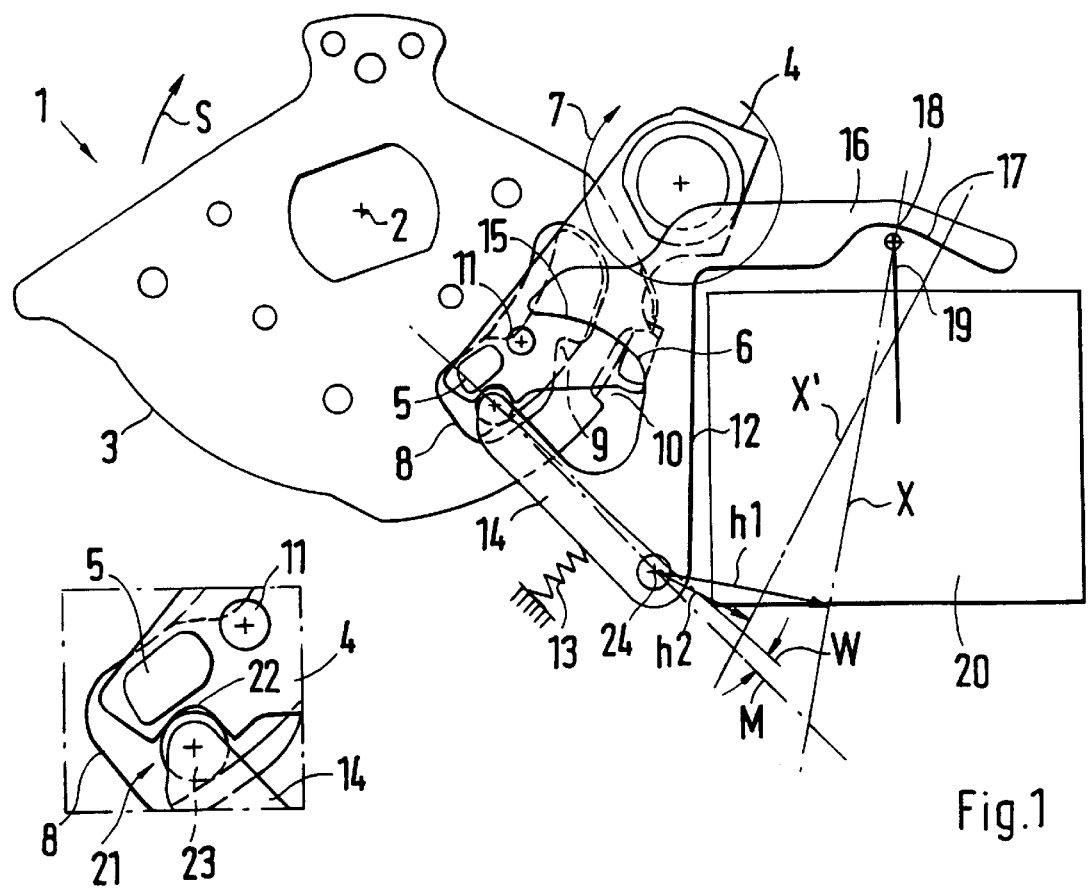
FIG. 1 shows an overview of the opening of the locking device according to the present invention, with a portion shown isolated and enlarged.

FIG. 1 shows a locking device designated generally by numeral 1 located in a selector of generally conventional construction. The selector has a selector lever mounted to pivot around an axis 2 and is nonrotatably connected with a locking member 3. Also provided is a latching element 4 having two latching pawls 5, 6 and being pretensioned by a torsion spring (not shown) in the direction of arrow 7. In correspondence to first latching pawl 5, a projection 9 is provided in a recess 8 of the locking member 3. In addition, a recess 10 is provided externally on the locking member 3 that matches the second latching pawl 6. Finally, a pin 11 is provided on the latching element 4.

A latching lever 12, likewise mounted integrally with the housing, is held in its resting position as shown by a compression spring 13. The latching lever 12 has a support 14, a sliding surface 15, and an actuating surface 17 on an actuating arm 16. A head 18 of a plunger 19 moved by a solenoid 20 acts on the actuating surface 17.

In the position shown in FIG. 1, the locking member 3 is in a position "P" of the selector lever. The solenoid 20 is not energized, and the latching lever 12, like the latching element 4, is in its resting position. The second latching pawl 6 is engaged in the recess 10. The contact between the second latching pawl 6 and the recess 10 is configured so that when the locking member 1 moves in the latching direction S, the latching pawl 6 is pushed out of the recess 10, in other words recess 10 ejects the latching pawl 6.

In order to prevent the latching pawl 6 from being forced out of the recess 10 when a force is applied in the latching direction S, a recess 22 is provided in the latching element 4 and corresponds to a head 21 of the support 14. The recess 22 receives a roller 23 rotatably mounted on the head 21 of the support 14. The contact between the roller 23 and the recess 22 is such that a line of application W varies by approximately 0.5 degrees from a center line M of the support 14, so that overall contact between the support 14 and the recess 22 is directed inward. A force that engages the latching element 4 opposite to the direction of arrow 7 causes the latching lever 12 in the illustrated embodiment to move clockwise, thus reliably preventing the roller 23 from sliding out of the recess 22. As a result of the selected slight deviation between the line of application W and the center line M, the forces then acting on the latching lever 12 are comparatively small and can be overcome by the force of the solenoid 20.

In the position shown, therefore, the locking member 3 is supported shapewise on the housing of the selector and can move only following deformation or breakage of the latching pawl 6 or the latching lever 12. In this case, no forces whatever are supported by springs such as the compression spring 13 or the solenoid 20. In order to unlock the locking device 1 and to move the selector lever out of the illustrated position "P" shown in FIG. 1, solenoid 20 is energized. The head 18 of the plunger 19 presses on the actuating lever 17, and as the latching lever 12 pivots, the head 18 slides on the actuating surface 17. The actuating surface 17 is curved so that at the beginning of the movement of the latching lever 12, a line of application X relative to a pivot 24 of the latching lever 12 has a long lever arm h1, but, as the pivoting movement of latching lever 12 progresses, the line of application is displaced in the direction X' and the lever arm is reduced to an amount h2. Thereby, the moment applied by the solenoid 20 on the latching lever 12 at the beginning of the pivoting movement of the latching lever 2 is so great that even under the load of the locking device 1 with a force in the locking direction S, the roller 23 can be moved out of the recess 22.

Figure 2:
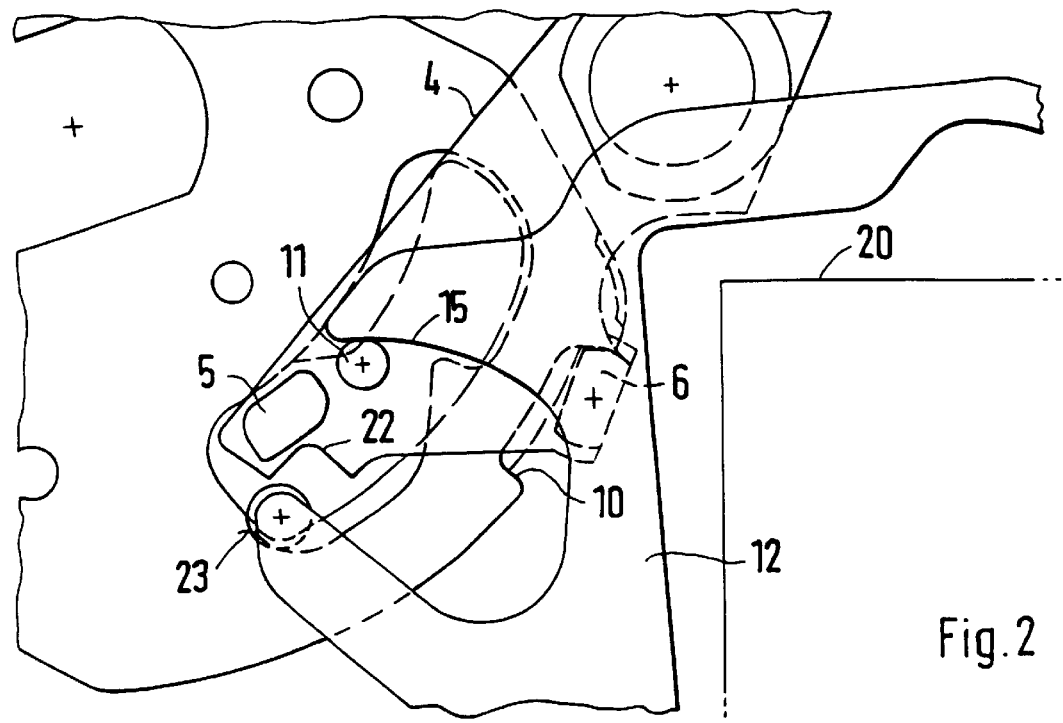
FIG. 2 is an enlarged view of a portion of the locking device shown in FIG. 1 in a position "P" with an energized solenoid.

FIG. 2 shows the latching lever 12 immediately after the roller 23 has left the recess 22. In this position, the sliding surface 15 of the latching lever 12 abuts the pin 11 of the latching element 4. As the latching lever 12 pivots counterclockwise, the latching element 4 is also pivoted counterclockwise, while the pin 11 slides on the sliding surface 15. If the locking device 1 is influenced by a load engaging in the latching direction S, the second latching pawl 6 sliding out of the recess 10 reinforces the pivoting movement of the latching element 4.

Because no greater forces remain to be overcome by the latching lever 12 in the position shown in FIG. 2, the actuating path 17 for this portion of the pivoting movement can be such that a line of application in the direction X' between the head 18 and the actuating surface 17 is operative. As a result of the reduced lever arm h2 that then results, the pivot angle of the latching lever 12 is increased while the travel of the plunger 19 remains the same. Consequently, a slight total travel of the plunger 19 is sufficient to pivot the latching lever 12 far enough so that the latching element 4 is pivoted into its position shown in FIG. 3.

Figure 3:
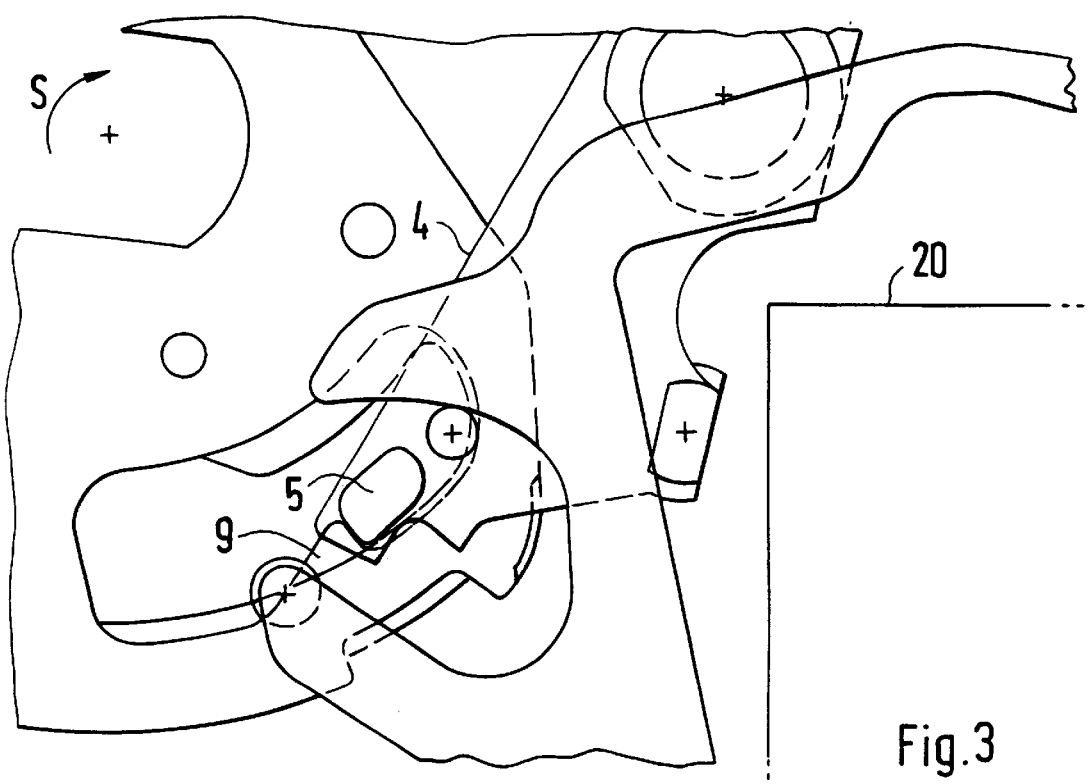
FIG. 3 is an enlarged view similar to FIG. 2 but in a position "N" with the solenoid energized.

In the position shown in FIG. 3, the locking member 3 is already in the "N" position of the selector lever. Previously, the first latching pawl 5, during the movement of locking member 3, slid in the latching direction S over a beveled flank of the projection 9. In the position "N" shown, the first latching pawl 5 abuts the back of the projection 9 which is configured in conjunction with the first latching pawl 5 such that, when the locking member 3 moves opposite the latching direction S, the latching element 4 is pivoted counterclockwise. Thus, the first latching pawl 5 cannot move beyond the projection 9 in this motion direction.

If the locking member 3 and hence also the selector lever is to be moved backward through the position "N" in the direction of position "P", the solenoid 20 is deenergized so that the latching lever 12 is pushed back by compression spring 13 into its resting position. The latching element 4, likewise spring-loaded, then pivots in the direction of its resting position.

Figure 4:
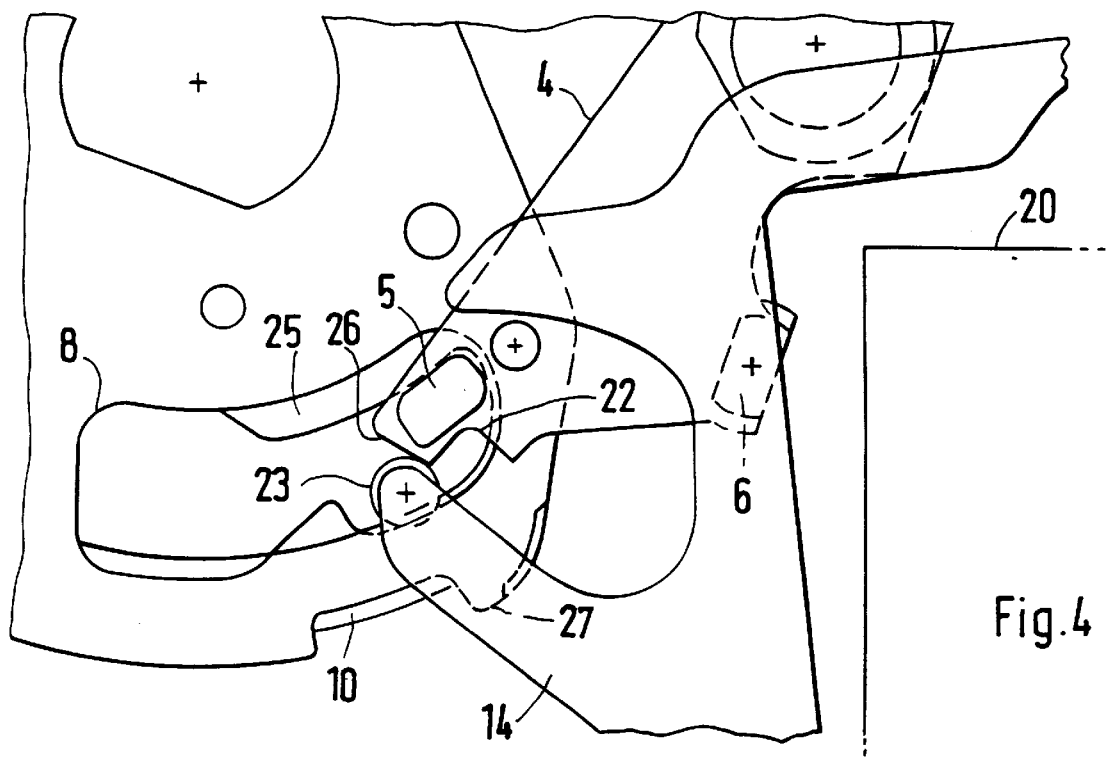
FIG. 4 is an enlarged view similar to FIGS. 2 and 3 but in a position "3" with the solenoid not energized.

A control contour 25 provided within the recess 8 server as a rear support for the first latching pawl 5 and prevents a complete backward pivoting of latching element 4 out of initial position "P" by the locking member 3 and hence by the selector lever. Because the latching element 4 is not pivoted backward completely into its resting position, the roller 23 of the support 4 abuts one end 26 of the latching element 4 as seen in FIG. 4 and thus cannot engage the recess 22. The control contour 25 prevents the latching element 4 from being blocked by the support 14. This is necessary so that when the solenoid 20 is not energized during a backward pivoting of the locking member 3 opposite the latching direction S, the second latching pawl 6 can slide over a projection 27 into the corresponding recess 10. If the locking member has resumed its initial position "P" once again when the latching magnet 20 is not energized, the control contour 25 no longer acts on the first latching pawl 5, and the latching element 4 and support 14 again resume their initial positions shown in FIG. 1, in which the locking member 3 and hence the selector lever as well are locked.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A locking device in combination with a motor vehicle selector lever, comprising at least one pivotally mounted latching element, a locking member provided with devices for form-lockingly accepting the at least one latching element in a first position of the latching element, and a pivotally-arranged latching lever configured to be actuatable by outside force for form-lockingly supporting the at least one latching element in the first position in a housing of the selective lever, wherein the latching lever is comprised of a first element for form-lockingly supporting the at least one pivotably mounted latching element in a first position and a second element for pivoting the at least one latching element into a second position.

2. The locking device according to claim 1, wherein the first element for supporting the at least one latching element in the first position is a support which operatively cooperates with a matching effective surface of the at least one latching element, the support being located in the first position such that a force applied in a latching direction on the at least one latching element results in an increase in force with which the latching lever is applied to the matching effective surface.

3. The locking device according to claim 1, wherein the at least one latching element comprises two latching pawls operatively cooperating with matching projections and recesses of the locking member, with a first of the latching pawls being effective in the first position of the at least one latching element and a second of the latching pawls being effective in a second position of the at least one latching element.

4. The locking device according to claim 3, wherein the first element for supporting the at least one latching element in the first position is a support which operatively cooperates with a matching effective surface of the at least one latching element, the support being located in the first position such that a force applied in a latching direction on the at least one latching element results in an increase in force with which the latching lever is applied to the matching effective surface.

5. The locking device according to claim 2, wherein the outside force is applied to the latching lever such that in the position of the latching lever for supporting the at least one latching element in the first position, a first force at a first travel is applied to the support and then a second travel greater than the first travel is performed at a second force smaller than the first force when the latching lever pivots.

6. The locking device according to claim 5, wherein the at least one latching element comprises two latching pawls operatively cooperating with matching projections and recesses of the locking member, with a first of the latching pawls being effective in the first position of the at least one latching element and a second of the latching pawls being effective in a second position of the at least one latching element.

7. The locking device according to claim 5, wherein the outside force is applied by a solenoid, with the introduction of the outside force from the solenoid into the latching lever being such that a length of the lever arm acting to introduce the outside force is greater in the first position than a length of the lever arm operative during further pivoting of the at least one latching element into the second position.

8. The locking device according to claim 2, wherein a contour of the locking member is such that the support, outside a position of the locking member to be locked, does not engage the matching effective surface on the at least one latching element including a non-actuated state of the latching lever.

9. The locking device according to claim 8, wherein the at least one latching element comprises two latching pawls operatively cooperating with matching projections and recesses of the locking member, with a first of the latching pawls being effective in the first position of the at least one latching element and a second of the latching pawls being effective in a second position of the at least one latching element.

10. The locking device according to claim 9, wherein the outside force is applied to the latching lever such that in the position of the latching lever for supporting the at least one latching element in the first position, a first force at a first travel is applied to the support and then a second travel greater than the first travel is performed at a second force smaller than the first force when the latching lever pivots.

11. The locking device according to claim 10, wherein the outside force is applied by a solenoid, with the introduction of the outside force from the solenoid into the latching lever being such that a length of the lever arm acting to introduce the outside force is greater in the first position than a length of the lever arm operative during further pivoting of the at least one latching element into the second position.

* * * * *